| United States Patent [19] | [11] Patent Number: 5,039,586 |
| Itami et al. | [45] Date of Patent: Aug. 13, 1991 |

[54] ELECTROPHOTOGRAPHIC PHOTORECEPTOR

[75] Inventors: Akihiko Itami; Akira Kinoshita; Naohiro Hirose; Kazumasa Watanabe; Kiyoshi Sawada, all of Hino, Japan

[73] Assignee: Konica Corporation, Tokyo, Japan

[21] Appl. No.: 431,912

[22] Filed: Nov. 6, 1989

[30] Foreign Application Priority Data

Nov. 11, 1988 [JP] Japan ................................ 63-286536

[51] Int. Cl.$^5$ ............................................. G03G 5/06
[52] U.S. Cl. ....................................... 430/78; 540/141
[58] Field of Search ...................... 430/59, 78; 540/141

[56] References Cited

U.S. PATENT DOCUMENTS 4,728,592  3/1988  Ohaku et al. .......................... 430/59
4,898,799  2/1990  Fujimaki et al. ...................... 430/59

*Primary Examiner*—John Goodrow
*Attorney, Agent, or Firm*—Jordan B. Bierman

[57] ABSTRACT

An electrophotographic photoreceptor containing titanyl phthalocyanine that has a maximum intensity peak of the Bragg angle $2\theta$ at $27.3°\pm0.2°$ with respect to characteristic X-rays of Cu K$\alpha$ at a wavelength of 1.541Å and which has a maximum intensity peak of $6.8°\pm0.2°$ in the $2\theta$ range of $6°-8°$ is disclosed.

8 Claims, 14 Drawing Sheets

ELECTROPHOTOGRAPHIC PHOTORECEPTOR

BACKGROUND OF THE INVENTION

The present invention relates to an electrophotographic photoreceptor, in particular, one that is suitable for use with printers, copiers, etc. and which shows high sensitivity to light from LED and semiconductor lasers.

Electrophotographic photoreceptors having high sensitivity to visible light are used extensively with copiers, printers, etc. Most common photoreceptors that are used in these applications are inorganic photoreceptors provided with light-sensitive layers that are chiefly composed of inorganic photoconductive materials such as selenium, zinc oxide and cadmium sulfide. However, such inorganic photoreceptors are not completely satisfactory in such characteristics as photosensitivity, heat stability, moisture resistance and durability that are required of electrophotographic photoreceptors to be used with copiers, printers, etc. For instance, selenium will crystallize upon heating or exposure to dirt such as sebum, often leading to deterioration of the photoreceptors that use it as a photoconductor. Photoreceptors that use cadmium sulfide are low in moisture resistance and durability, whereas those using zinc oxide are poor in durability. Further, photoreceptors using selenium or cadmium sulfide are subject to great restraints during manufacture and handling.

With a view to solving these problems with inorganic photoconductive materials, attempts have been made to use a variety of organic photoconductive materials in the light-sensitive layers of photoreceptors and active R&D efforts are being made today along this line. For example, JP-B-50-10496 (the term "JP-B" as used hereinafter means an "examined Japanese patent publication") describes an organic photoreceptor having a light-sensitive layer containing poly-N-vinylcarbazole and 2,4,7-trinitro-9-fluorenone. However, even this photoreceptor is not completely satisfactory in terms of sensitivity and durability. To overcome this problem, an electrophotographic photoreceptor of a functionally separated type has been developed. In this type of photoreceptor, the light-sensitive layer is divided into a carrier generation layer and a carrier transport layer, with a carrier generation material and a carrier transport material being cntained in the respective layers. Since the carrier generating and transporting capabilities are individually fulfilled by different materials, suitable materials can be selected from a broad range of choices and hence a photoreceptor having desired characteristics can be obtained fairly easily. For these reasons, it is anticipated that an organic photoreceptor having high sensitivity and durability can be produced using the concept of function separation.

A great number of materials have so far been proposed that can be effectively used as carrier generating materials in the carrier generation layer of a functionally separated electrophotographic photoreceptor. An illustrative inorganic material that can be used is amorphous selenium (see JP-B-43-16198). A carrier generation layer containing this amorphous selenium is used in combination with a carrier transport layer containing an organic carrier transport material. However, the carrier generation layer comprising amorphous selenium suffers the problem of deterioration of its characteristics because as already mentioned, selenium will crystalize upon heating or exposure to sebum. Organic materials can also be used as carrier generation materials and they are exemplified by organic dyes and pigments. For example, the use of bisazo compounds in light-sensitive layers has been proposed in JP-A-47-37543 (the term "JP-A" as used herein means an "unexamined published Japanese patent application"), JP-A-55-22834, JP-54-79632, JP-A-56-116040, etc. These and other known bisazo compounds show fairly good sensitivity in either the short or medium wavelength range but their sensitivity in the long wavelength range is too low to justify their use with laser printers which employ semiconductor lasers as light sources that are anticipated to insure high reliability.

Gallium-aluminum-arsenic (Ga.Al.As) light-emitting devices which are extensively used in semiconductor lasers operate at wavelengths long than 750 nm. Many studies have so far been conducted in order to obtain electrophotographic photoreceptors that have high sensitivity to light in the wavelength range longer than 750 nm. For instance, it has been proposed that spectral sensitizers that extend the wavelength of sensitivity to the longer range should be added to light-sensitive materials such as Se and CdS having high sensitivity to the visible range. However, as already mentioned, Se and CdS do not have satisfactory resistance to environmental factors such as temperature and moisture and hence are not considered to be ideal materials.

Although many organic photoconductive materials are known, their sensitivity is generally limited, as mentioned above, to the visible region shorter than 700 nm and very few organic materials have satisfactory sensitivity to the range longer than 700 nm. The rare exception is phthalocyanine compounds which are known to have sensitivity to a longer wavelength range than other organic photoconductive materials. An example of such photoconductive phthalocyanine compounds is α-titanyl phthalocyanine which is described in JP-A-61-239248. This α-titanyl phthalocyanine has peaks of the Bragg angle at 7.5°, 12.3°, 16.3°, 25.3° and 28.7° with respect to X-rays of Cu Kα at 1.541 Å. However, it has low sensitivity and its potential stability during cyclic use is so poor that it will readily experience fogging in electrophotographic processes which rely upon reversal development.

The titanyl phthalocyanine of type II described in JP-A-62-67094 has a peak of the Bragg angle ($2\theta$) at 27.3° and the peak of maximum intensity is located at about 7.5° in the $2\theta$ range of 6°–8°. However, this titanyl phthalocyanine of type II has low chargeability and suffers from such disadvantages as high levels of dark decay and residual potential.

Thus, the prior art titanyl phthalocyanine compounds of the α-form and type II have not been completely satisfactory for use in electrophotographic photoreceptors from various aspects such as chargeability, sensitivity and potential stability during cyclic use.

SUMMARY OF THE INVENTION

An object, therefore, of the present invention is to provide an electrphotographic photoreceptor using titanyl phthalocyanine that has high sensitivity, good chargeability and high potential stability during cyclic use.

The electrophotographic photoreceptor of the present invention contains titanyl phthalocyanine that has a maximum intensity peak of the Bragg angle $2\theta$ at 27.3°±0.2° with respect to characteristic X-rays of Cu Kα at a wavelength of 1.541 Å and which has a maximum intensity peak of 6.8°±0.2° in the 2θ range of 6°-8°. In a particularly desirable embodiment, titanyl pathalocyanine that has peaks of the Bragg angle (2θ) clearly distinct from noise at 6.8°±0.2°, 9.5°±0.2°, 11.5°±0.2°, 13.4°±0.2°, 18.0°±0.2°, 24.1°±0.2° and 27.3°±0.2° and which has a maximum intensity peak at 27.3°±0.2° in the 2θ range of 5°-35° and a maximum intensity peak at 6.8°±0.2° in the range of 6°-8° is contained in the light-sensitive layer.

The term "peak" as used herein means an acute-angled projection that is clearly distinct from noise.

DETAILED DESCRIPTION OF THE INVENTION

Light-sensitive layers containing photoconductive materials are usually formed by such methods as dispersion coating, dissolution coating and vapor-phase growth, and in almost all cases, the photoconductive materials are present in a polycrystalline rather than single-crystal state in the light-sensitive layers. In such a situation, the interfaces of individual crystallites (grain boundaries and surfaces) will assume an extremely large total area. As is generally known, points or regions of irregularity where the crystal arrangement is not in order play an important role in determining the characteristics of photoconductors and it is speculated that the reaction for the generation of photocarriers will take place at points of irregularity with high probability. Grain boundaries are typical regions of irregularity and since they exist at high density in ordinary light-sensitive layers, the efficiency of photocarrier generation will be greatly influenced by the properties of grain boundaries.

The type of crystal faces that delineate certain grain boundaries will vary with the conditions of crystal formation. Generally, the growth rate of a crystal differs with crystal face and the surfaces of a grown crystal, namely their grain boundaries, will be predominantly occupied by faces that grow at the slowest rate.

Figure 1:
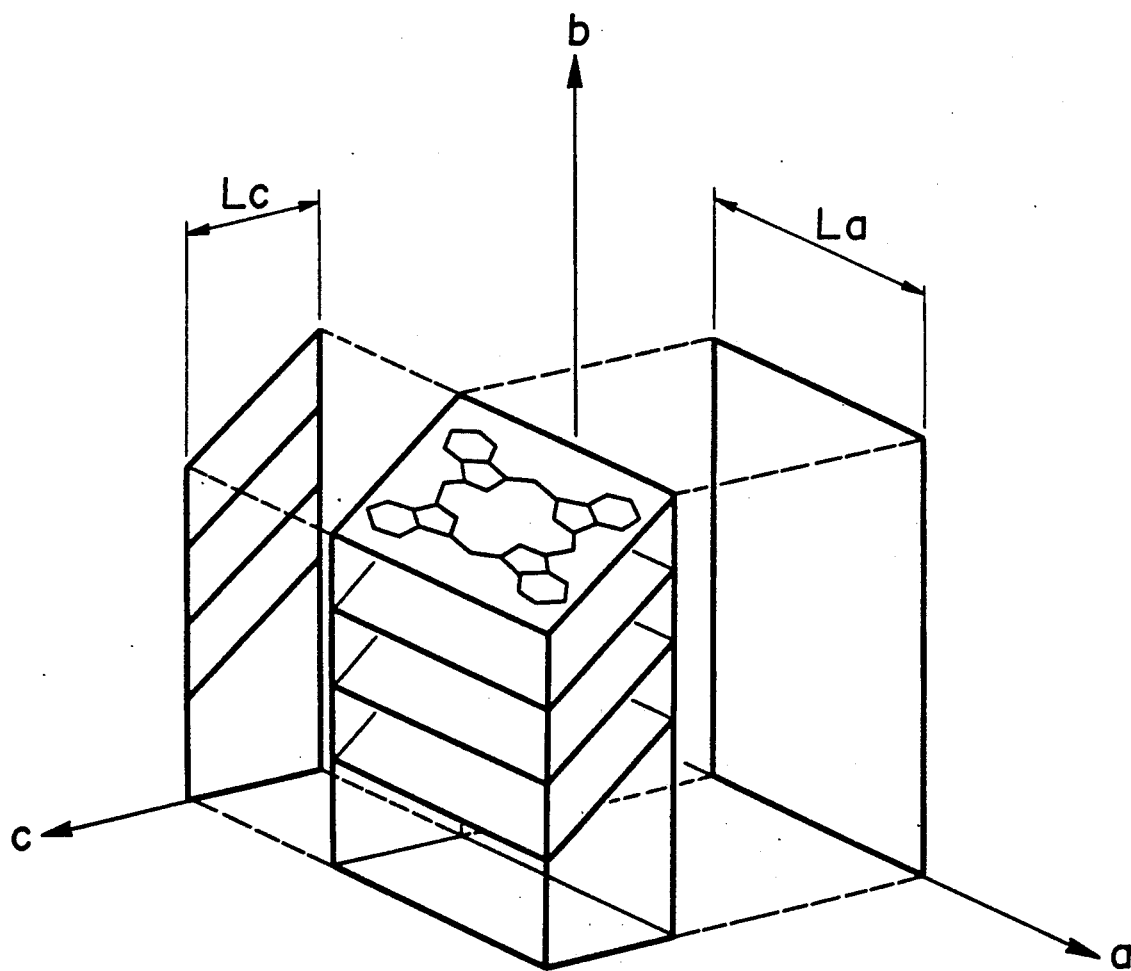
FIG. 1 shows the general structure of phthalocyanine in which planar molecules are stacked in a parallel manner.

Phthalocyanine compounds are known to have two prevalent crystalline structures, α-form and β-form, for various central metal atoms. A common feature of the two crystalline structures is that a column is formed of planar molecules that are stacked in such a way that the respective π-conjugate faces are superposed as shown in FIG. 1, in which b indicates the crystal axis along the stack of molecules whereas a and c are axes perpendicular to axis b.

Since the π-conjugate planes of phthalocyanine molecules are inclined with respect to axis b, the interplanar spacing that is projected onto a (100) face of the crystal will come out different from the interplanar spacing projected onto a (001) face. For instance, with α-platinum phthalocyanine, the interplanar spacing La along axis a is 13.2 Å and the spacing Lc along axis c is 12.1 Å. These provide peaks at 6.7° and 7.3° in an X-ray diffraction spectrum obtained with Cu Kα radiation. One may well assume that the peak of 6.7° will become stronger in a crystal produced under such conditions that a (100) face grows at a faster rate than a (001) face and that the peak of 7.3° will become stronger if the growth rate of (001) face is faster than that of (100) face. In other words, the grain boundaries will be predominantly occupied by (001) faces if the peak of 6.7° is the stronger whereas (100) faces will predominate if the peak of 7.3° is the stronger. Thus, an X-ray diffraction spectrum will provide information not only on interplanar spacings but also about the direction in which a certain crystal face grows.

As described above, the properties of grain boundaries are important factors for the characteristics of a photoconductor and an optimum state of grain boundaries must also be selected in searching for a novel photoconductor.

The titanyl phthalocyanine which is to be contained in the light-sensitive layer of the photoreceptor of the present invention has a maximum peak at 27.3°±0.2° in an X-ray diffraction spectrum and it is particularly characterized by having a maximum intensity peak at 6.8°±0.2° in the 2θ range of 6°-8°.

The titanyl phthalocyanine of type II described in JP-A-62-67094 has a peak at 27.3° but it does not have a peak at 6.8°±0.2° in the range of 6°-8°. Instead, it has a peak at 7.5° in the range of 6°-8° and hence is entirely different from the titanyl phthalocyanine of the present invention in terms of the state of grain boundaries. The intended object of the present invention cannot be attained by such titanyl phthalocyanine of type II.

The intensity of peaks developing in the range of 6°-8° will vary depending upon the confitions of crystal formation but in accordance with the present invention, particularly good results will be obtained if a strong peak appears at 6.8°±0.2°.

The basic structure of the titanyl phthalocyanine used in the present invention is represented by the following general formula:

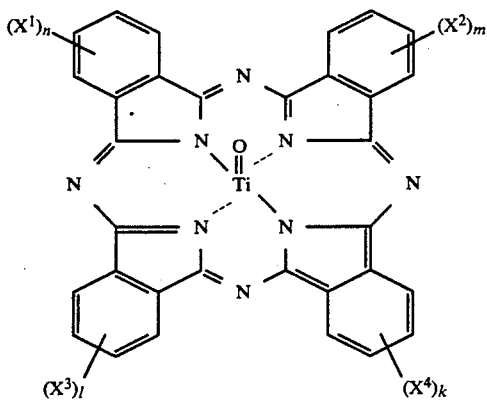

where $X^1$, $X^2$, $X^3$ and $X^4$ each independently represents a hydrogen atom, a halogen atom, an alkyl group or an alkoxy group, and n, m, l and k represent an integer of 0–4.

The X-ray diffraction spectrum of this titanyl phthalocyanine having the characteristics described above was measured under the following conditions (which will apply to all the description that follows):

| X-ray tube | Cu |
| --- | --- |
| Voltage | 40.0 kV |
| current | 100 mA |
| Start angle | 6.00 deg. |
| Stop angle | 35.00 deg. |
| Step angle | 0.020 deg. |
| Time of measurement | 0.50 sec. |

The electrophotographic photoreceptor of the present invention which contains the titanyl phthalocyanine described above desirably has a maximum absorption wavelength located at 780–830 nm in the absorption spectrum, with the range of 800±20 nm being more desirable. Said absorption spectrum is one of reflection type which is obtained by performing measurement with Model 320 Automatic Spectrophotometer (Hitachi Ltd.) on the photoreceptor prepared in Example 1 to be described hereinafter.

The method for preparing the titanyl phthalocyanine that is to be used in the present invention is hereunder described by way of example. First, titanium tetrachloride is reacted with phthalodinitrile in a solvent α-chloronaphthalene to obtain titanyl phthalocyanine (TiOPc). This may be followed by hydrolysis wigh aqueous ammonia or the like to complete the reaction. Preferably, the reaction product is treated with a solvent such as 2-ethoxyethanol, dioxane, tetrahydrofuran, acetone, N,N-dimethylformamide, N-methylpyrrolidone or α-chloronaphthalene.

Subsequently, the TiOPc is treated by the acid paste method described in F. H. Moser and A. L. Thomas, "Phthalocyanine Compounds" and thereafter milled in a solvent such as an aromatic or a halide at 20°–100° C. by means of agitation or mechanical shearing for a sufficient period of time to effect crystal conversion so as to prepare the TiOPc of the present invention. The aromatic or halide solvent may be used as an admixture with water or other solvents such as alcohols or ethers.

Common stirring apparatus such as homomixers, dispersers, agitators, stirrers, kneaders, Banbury mixers, ball mills, sand mills and attritors may be typically used in the step of crystal transition.

Besides the TiOPc thus obtained, other carrier generation materials may be used in the photoreceptor of the present invention. The amount in which other carrier generation materials is used is not limited to any particular values but the preferred amount is not more than 100 parts by weight per 100 parts by weight of TiOPc, with no more than 50 parts by weight being particularly preferred. Usable carrier generation materials are TiOPc compounds having different crystalline forms than the phthalocyanine of the present invention, such as α-TiOPc, β-TiOPc, TiOPc of mixed α- and β-forms, and amorphous TiOPc. Phthalocyanine pigments other than those listed above, azo pigments, anthraquinone pigments, perylene pigments, polycyclic quinone pigments, and squaric acid methine pigments may also be used.

There is no particular limitation on the carrier transport material that can be used in the photoreceptor of the present invention when it is designed as a functionally separated type. Typical examples include oxazole derivatives, oxadiazole derivatives, thiazole derivatives, thiadiazole derivatives, triazole derivatives, imidazole derivatives, imidazolone derivatives, imidazolidine derivatives, bisimidazolidine derivatives, styryl compounds, hydrazone compounds, pyrazoline derivatives, oxazolone derivatives, benzothiazole derivatives, benzimidazole derivatives, quinazoline derivatives, benzofuran derivatives, acridine derivatives, phenazine derivatives, aminostilbene derivatives, poly-N-vinylcarbazole, poly-1-vinylpyrene and poly-9-vinylanthracene.

More specific examples are listed below:

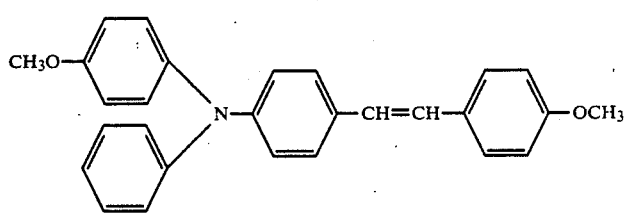

(1)

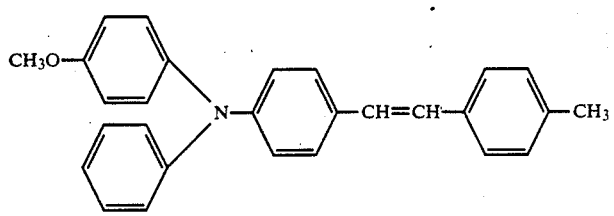

(2)

-continued
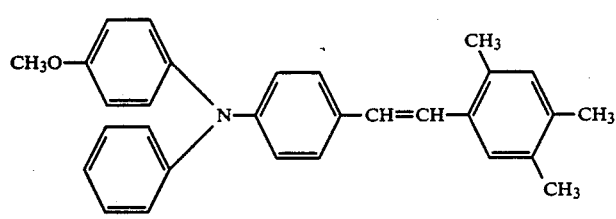
(3)
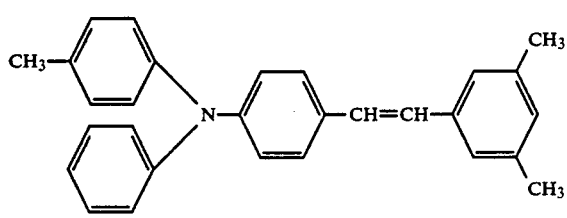
(4)
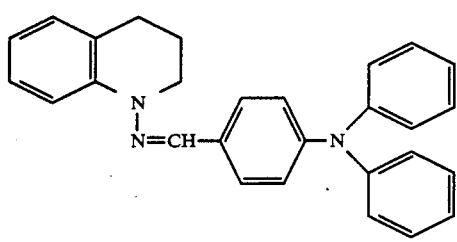
(5)
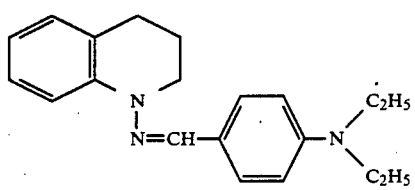
(6)
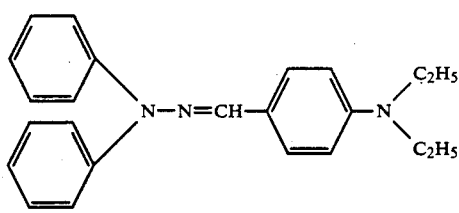
(7)
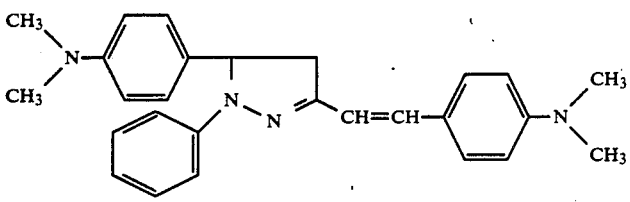
(8)
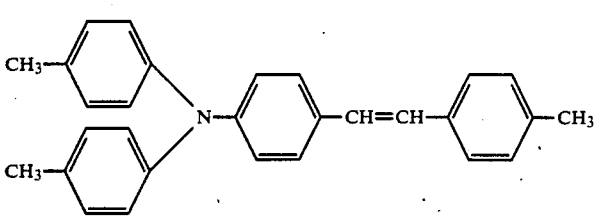
(9)

-continued
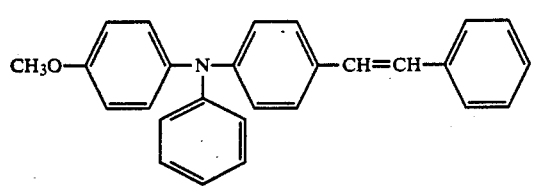
(10)
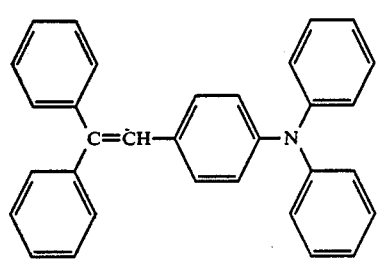
(11)
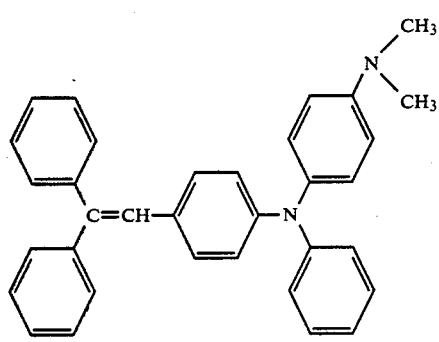
(12)
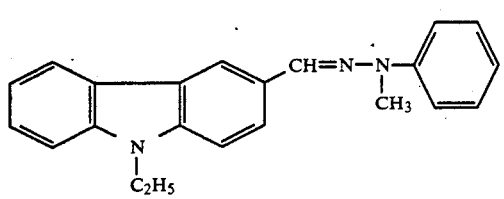
(13)
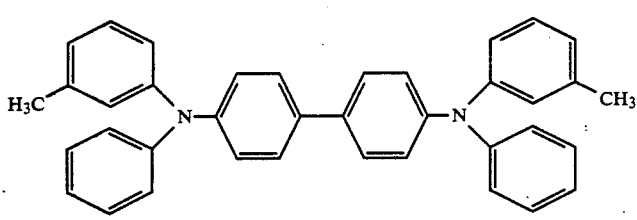
(14)
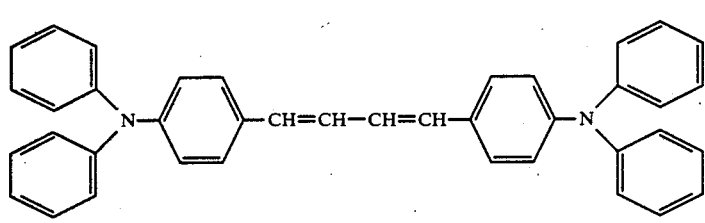
(15)

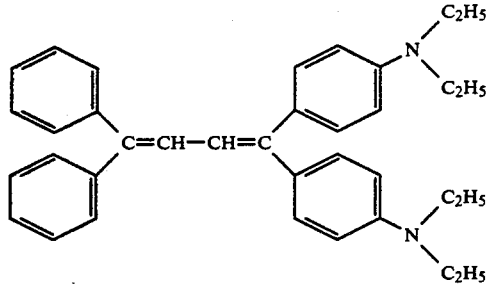
(16)

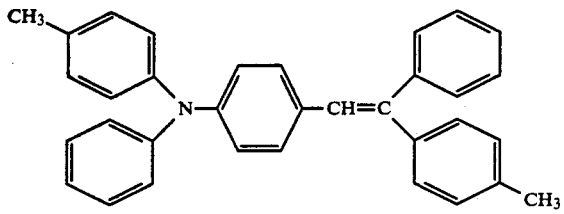
(17)

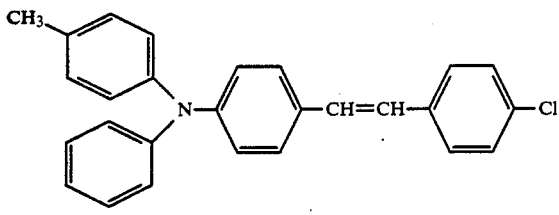
(18)

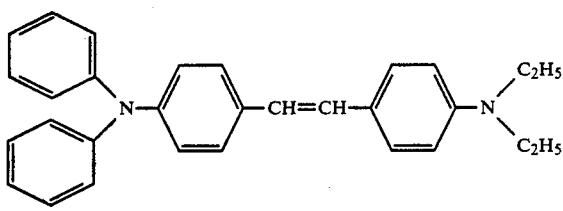
(19)

Figure 14:
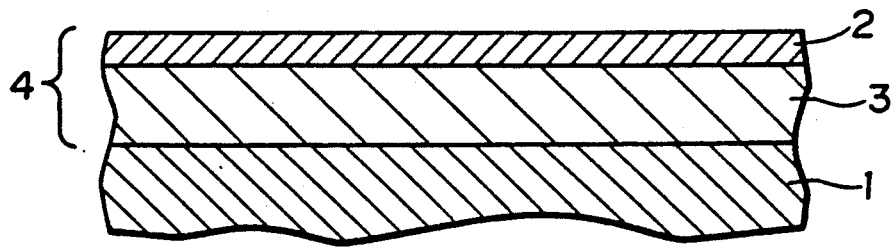
Figure 15:
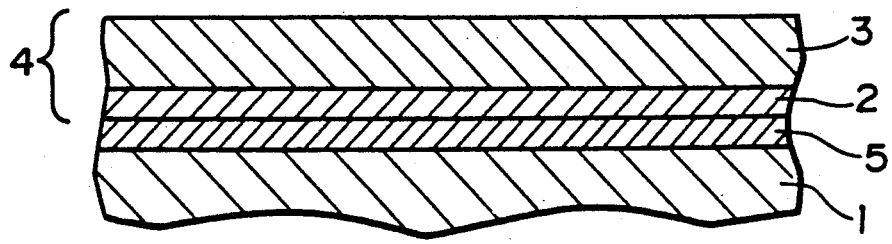
Figure 16:
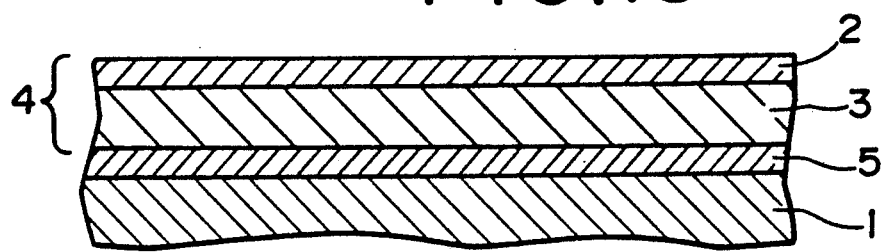
Figure 17:
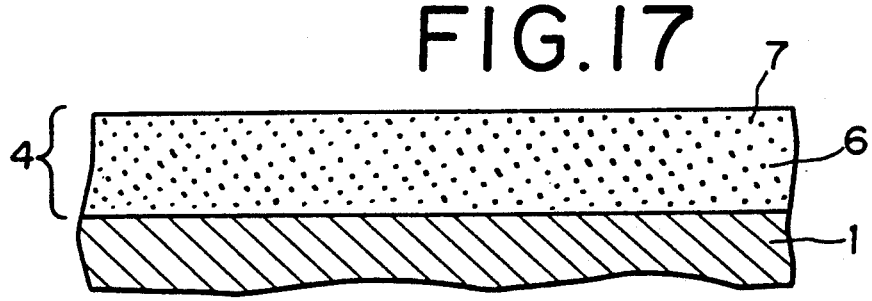
Figure 18:
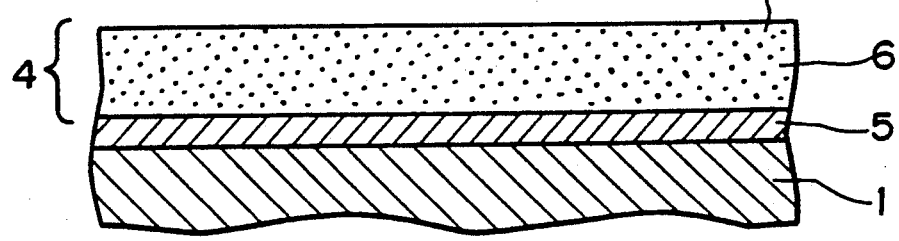

In order to make the light-sensitive layer of the photoreceptor of the present invention, the carrier generation materials described above may be dispersed in a binder, with the resulting layer being formed on a conductive base support. Alternatively, such carrier generation materials may be combinaed with a suitable carrier transport material to form a dual or single-layered light-sensitive layer of a functionally separated type. Common examples of the layer arrangement for a functionally separated light-sensitive layer are shown in FIGS. 13–18. The layer arrangement shown in FIG. 13 comprises a conductive support 1 which is coated with a carrier generation layer 2 containing the TiOPc of the present invention, which is overlaid with a carrier transport layer 3 containing a suitable carrier transport material so as to form a light-sensitive layer 4. In FIG. 14, the arrangement of carrier generation layer 2 and carrier transport layer 3 is reversed to form a light-sensitive layer 4'. In FIG. 15, an intermediate layer 5 is provided between the conductive support 1 and the light-sensitive layer 4 having the layer arrangement shown in FIG. 13. In FIG. 16, an intermediate layer 5 is provided between the conductive support 1 and the light-sensitive layer 4' having the layer arrangement shown in FIG. 14. The intermediate layer 5 in either FIG. 15 or 16 serves to block the injection of free electrons into the conductive support 1. FIG. 17 shows a single-layer arrangement in which a light-sensitive layer 4" contains the combination of a carrier generation material 6 chiefly composed of TiOPc of the present invention and a carrier transport material 7. In FIG. 18, an intermediate layer 5 is provided between this light-sensitive layer 4" and the conductive support 1 to prevent injection of free electrons into the conductive support 1.

In the light-sensitive layer of a dual structure, the carrier generation layer 2 and the carrier transport layer 3 may be formed by either one of the following methods:

(A) a carrier generation material and a carrier transport material that are respectively dissolved in suitable solvents, optionally in the presence of a binder, are coated onto the conductive support;

(B) a carrier generation material and a carrier transport material are reduced to fine particles in suitable dispersion media by means of a ball mill, a homomixer or sonication, and the resulting dispersions, optionally in the presence of a binder, are coated onto the conductive support.

Illustrative solvents or dispersion media that may be used in forming the carrier generation and transport layers include: butylamine, N,N-dimethylformamide, acetone, methyl ethyl ketone, cyclohexanone, benzene, toluene, xylene, chloroform, 1,2-dichloroethane, dichloromethane, tetrahydrofuran, dioxane, methanol, ethanol, isopropanol, ethyl acetate, butyl acetate and dimethyl sulfoxide. If a binder is to be used in forming the carrier generation layer or carrier transport layer, said binder may be of any type but a particularly preferred example is a high-molecular weight polymer having an electrically insulating film-forming capability that is hydrophobic and which has high dielectric constant. Non-limiting examples of such polymers are listed below:
1) polycarbonates
2) polyesters
3) methacrylic resins
4) acrylic resins
5) polyvinyl chloride
6) polyvinylidene chloride
7) polystyrene
8) polyvinyl acetate
9) styrene-butadiene copolymer
10) vinylidene chloride-acrylonitrile copolymer
11) vinyl chloride-vinyl acetate copolymer
12) vinyl chloride-vinyl acetate- maleic anhydride copolymer
13) silicone resin
14) silicone-alkyd resin
15) phenol-formaldehyde resin
16) styrene-acrylic copolymer resin
17) styrene-alkyd resin
18) poly-N-vinylcarbazole
19) polyvinyl butyral
20) polycarbonate Z resin.

These binders may be used either on their own or as admixtures. The carrier generation material is generally used in an amount of 10-600 parts by weight, preferably 50-400 parts by weight, per 100 parts by weight of the binder, and the carrier transport material is generally used in an amount of 10-500 parts by weight per 100 parts by weight of the binder.

The thus formed carrier generation layer 2 preferably has a thickness of 0.01-20 μm, with the range of 0.05-5 μm being more preferred. The carrier transport layer generally has a thickness of 2-100 μm, preferably 5-30 μm.

When the carrier generation material is to be dispersed in the light-sensitive layer, it is preferably reduced to particles having an average size of 2 μm or below, preferably 1 μm or below. If the particles of the carrier generation material are too large, they will not be dispersed efficiently in the light-sensitive layer. Further, some of the particles will protrude from the surface of the light-sensitive layer to impair its smoothness, with occasional occurrence of discharge at the protruding particles or toner filming due to the deposition of toner particles on the protrusions.

In order to improve sensitivity or reduce residual potential or fatigue due to cyclic use, the light-sensitive layer of the photoreceptor of the present invention may contain one or more electron-accepting materials. Useful electron-accepting materials are selected from among the following compounds having high electron affinity: succinic anhydride, maleic anhydride, dibromosuccinic anhydride, phthalic anhydride, tetrachlorophthalic anhydride, tetrabromophthalic anhydride, 3-nitrophthalic anhydride, 4-nitrophthalic anhydride, pyromellitic anhydride, mellitic anhydride, tetracyanoethylene, tetracyanoquinodimethane, o-dinitrobenzene, m-dinitrobenzene, 1,3,5-trinitrobenzene, paranitrobenzonitrile, picryl chloride, quinone chloromide, chloranil, bromanil, dichlorodicyanoparabenzoquinone, anthraquinone, dinitroanthraquinone, 9-fluorenylidene(dicyanomethylene malonodinitrile), polynitro-9-fluorenylidene(dicyanomethylene malonodinitrile), picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid, and mellitic acid.

These electron-accepting materials are used in such amounts that the weight ratio of carrier generation material to electron-accepting material is in the range of from 100:0.01 to 100:200, preferably from 100:0.1 to 100:100.

The support 1 on which the light-sensitive layer is to be formed may be a metal plate, a metal drum or a thin conductive layer that is made of a conductive polymer, a conductive compound such as indium oxide or a metal such as aluminum, palladium or gold and which is coated, vapor-deposited, laminated or otherwise formed on a substrate such as paper or a plastic film. The intermediate layer serving as an adhesive or barrier layer may be made of an organic high-molecular weight material or aluminum oxide. Examples of the organic high-molecular weight material are the high-molecular weight polymers already described in connection with the binder resin, as well as polyvinyl alcohol, ethyl cellulose and carboxymethyl cellulose.

In accordance with the present invention, an electrophotographic photoreceptor that is sensitive to light in the longer wavelength range, in particular, one having a wavelength range of sensitivity optimum for semiconductor lasers and LED can be produced using the TiOPc which is described hereinabove. Further, the photoreceptor of the present invention has advantageous features of high sensitivity, improved chargeability and good potential stability.

SYNTHESIS EXAMPLE 1

Titanium tetrachloride (18 g) was added dropwise to a mixture of phthalodinitrile (40 g) and α-chloronaphthalene (500 ml) in a nitrogen stream. Thereafter, the reaction mixture was slowly heated to 250° C., at which it was stirred for 3 h to complete the reaction. Subsequently, the reaction mixture was left to cool to room temperature and filtered to obtain dichlorotitanium phthalocyanine as the reaction product. The dichlorotitanium phthalocyanine thus obtained was hydrolyzed with 300 ml of concentrated aqueous ammonia and thereafter washed with acetone to obtain TiOPc.

Five grams of the TiOPc was stirred in 100 g of 96% sulfuric acid at 3°-5° C. for 2 h and thereafter filtered. The resulting sulfuric acid solution was added dropwise to 3,000 ml of water and the precipitating crystal was recovered by filtration. This crystal was repeatedly washed with deionized water until the filtrate became neutral.

Figure 2:
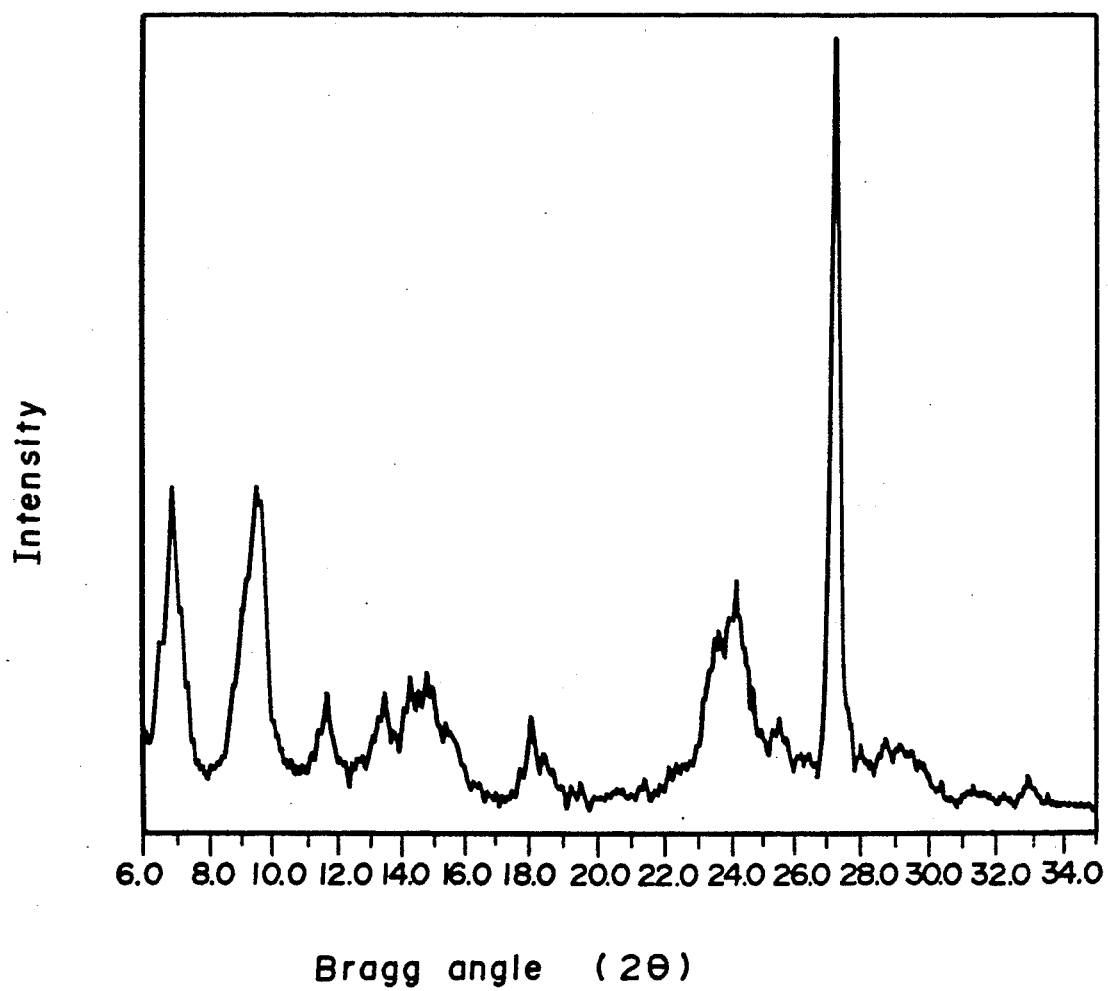
FIG. 2 is an X-ray diffractometer scan for the TiOPc used in Example 1.

To the thus obtained Nutsche cake, α-chloronaphthalene was added as a dispersion medium and the mixture was milled with a sand grinder at 20°-100° C. Subsequently, the dispersion medium was removed and the residue was washed with acetone and methanol to obtain a brilliant blue crystal. As shown in FIG. 2, this crystal had a maximum intensity peak at a Bragg angle (2θ) of 27.2°, a maximum intensity peak at 6.9° in the 2θ range of 6°-8°, as well as peaks at 6.9°, 9.6°, 11.7°, 13.5°, 18.1°, 24.1° and 27.3°. Thus, this crystal was found to be a TiOPc within the scope of the present invention.

SYNTHESIS EXAMPLE 2

The procedure of Synthesis Example 1 was repeated except that α-chloronaphtalene used as a dispersion medium for the milling operation was replaced by o-dichlorobenzene and that milling was effected at room temperature.

Figure 4:
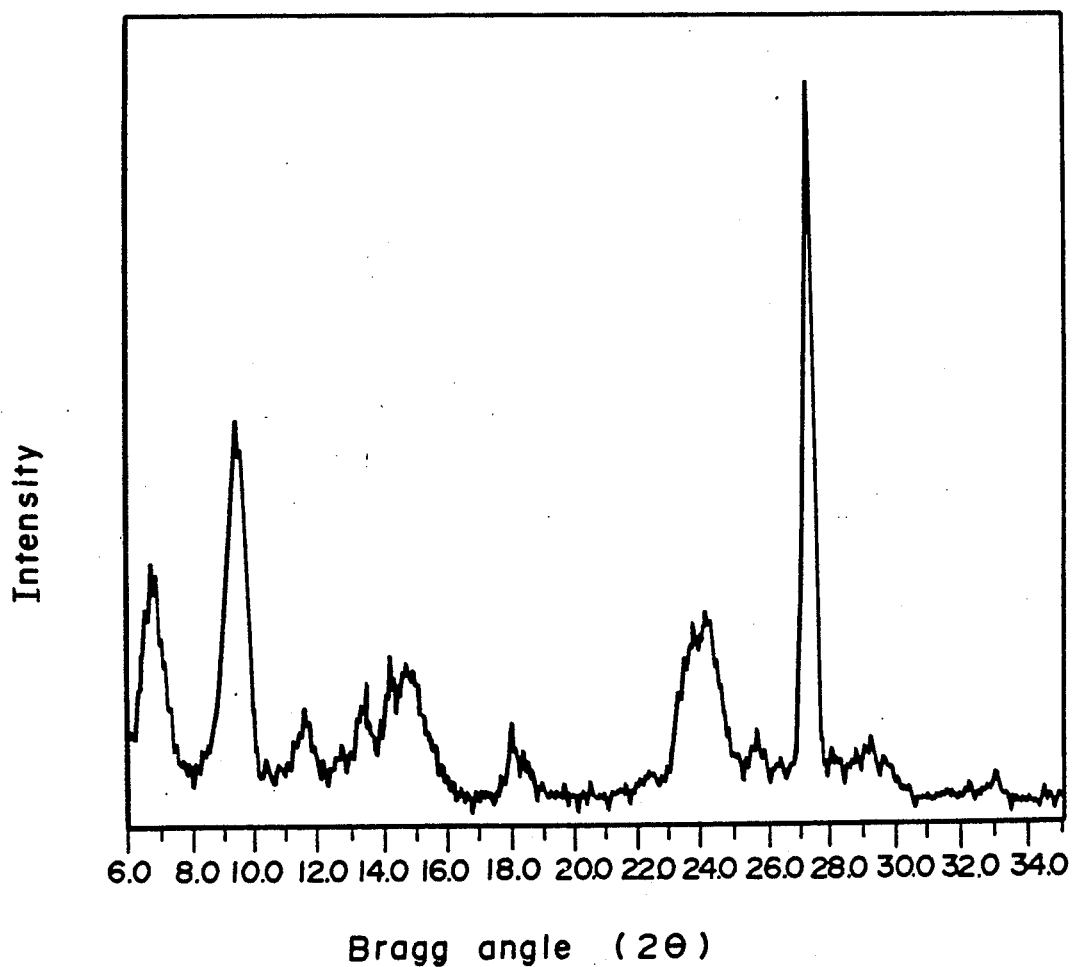
FIG. 4 is an X-ray diffractometer scan for the TiOPc used in Example 2.

As shown in FIG. 4, the TiOPc thus obtained had a maximum intensity peak at a Bragg angle (2θ) of 27.3°, a maximum intensity peak at 6.8° in the 2θ range of 6°-8°, as well as peaks at 6.8°, 9.5°, 11.5°, 13.4°, 18.0°, 24.1° and 27.3°. Thus, this TiOPc was found to be within the scope of the present invention.

COMPARATIVE SYNTHESIS EXAMPLE 1

Figure 6:
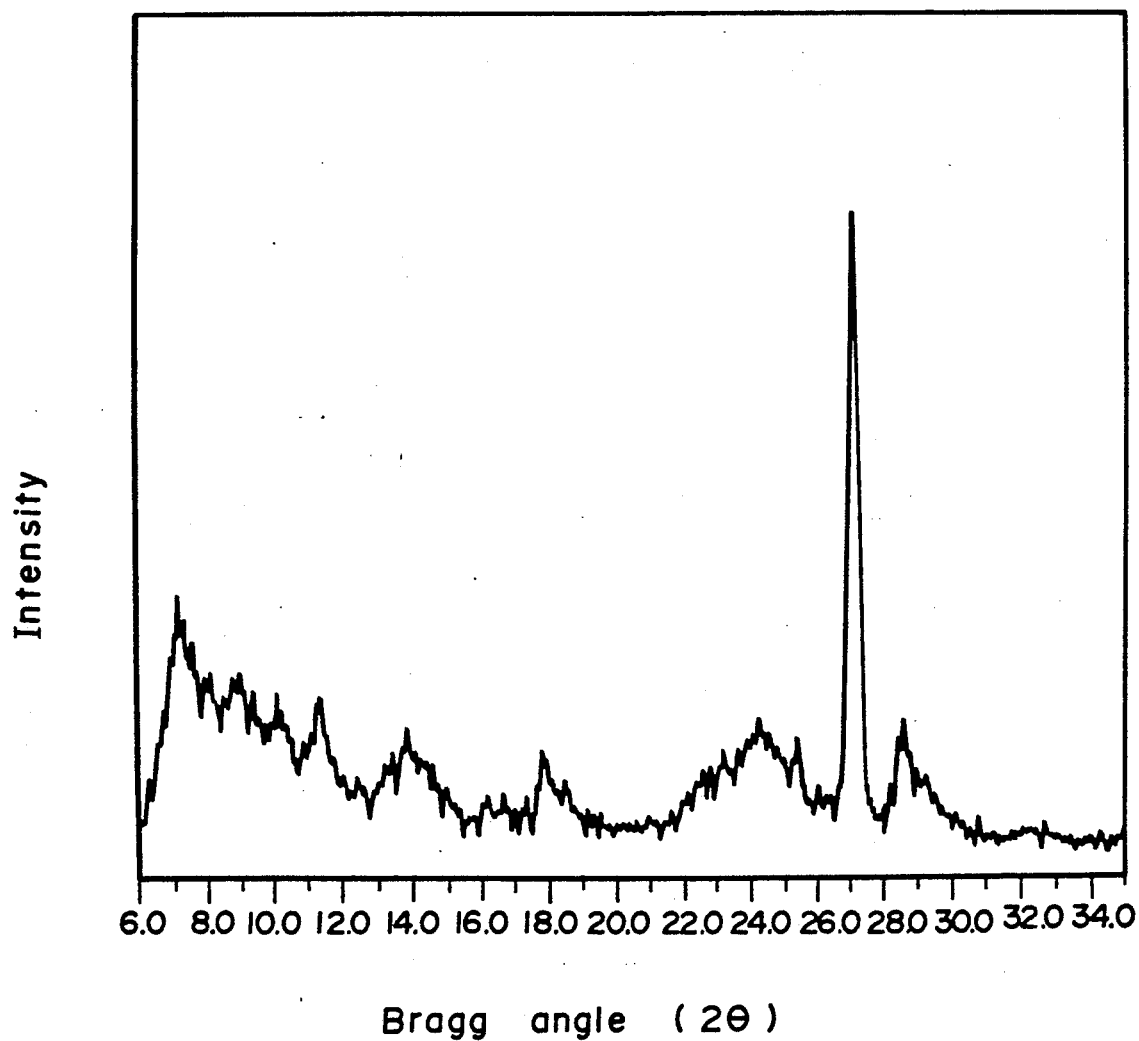
FIG. 6 is an X-ray diffractometer scan for the TiOPc used in Comparative Example 1.

Titanium tetrachloride (14.7 ml) was added to a mixture of phthalodinitrile (65 g) and α-chloronaphthalene (500 ml) in a nitrogen stream. Thereafter, the reaction mixture was slowly heated to 200° C. and stirred for 3 h at a controlled temperature of 200°-220° C. to complete the reaction. Subsequently, the reaction mixture was left to cool to 130° C. and filtered while hot. By washing with α-chloronaphthalene, a Nutsche cake was obtained and further washed with α-chloronaphthalene. Subsequently, the cake was washed several times with 200 ml of methanol at 60° C., then washed several times with deionized water at 80° C. to complete hydrolysis. An X-ray diffractometer scan for the thus obtained TiOPc is shown in FIG. 6. It had a maximum intensity peak at a Bragg angle (2θ) of 27.3° but the maximum intensity peak for the 2θ range of 6°-8° was 7.5°.

Figure 8:
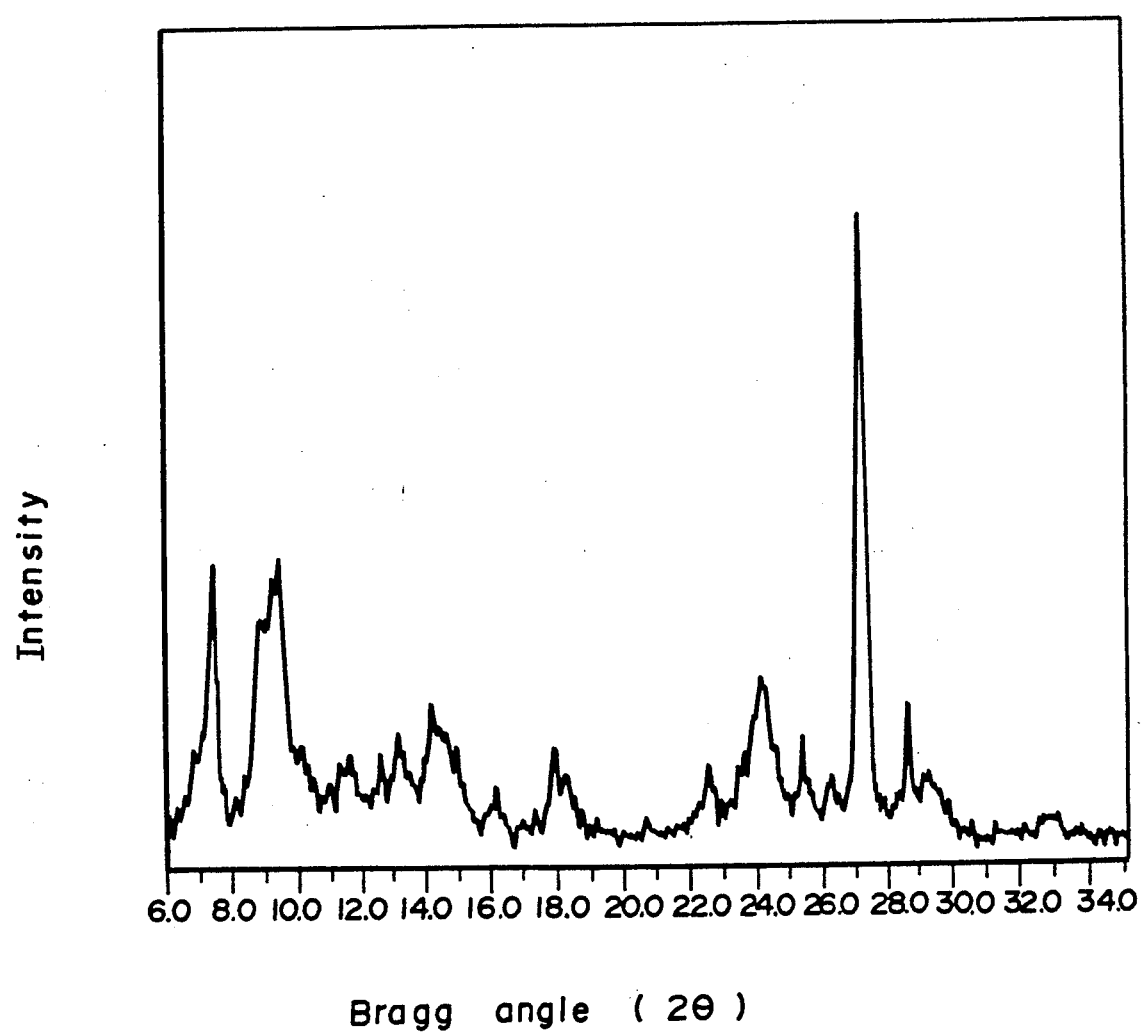
FIG. 8 is an X-ray diffractometer scan for the TiOPc used in Comparative Example 2.

To the thus obtained Nutsche case, o-dichlorobenzene was added as a dispersion medium and the mixture was milled with a sand grinder at 40°-60° C. Subsequently, the dispersion medium was removed and the residue was washed with acetone and methanol to obtain a brilliant blue crystal. An X-ray diffractometer scan for this crystal of TiOPc is shown in FIG. 8. It had a maximum intensity peak at a Bragg angle (2θ) of 27.3° but the maximum intensity peak for the 2θ range of 6°-8° was 7.5°.

COMPARATIVE SYNTHESIS EXAMPLE 2

Figure 10:
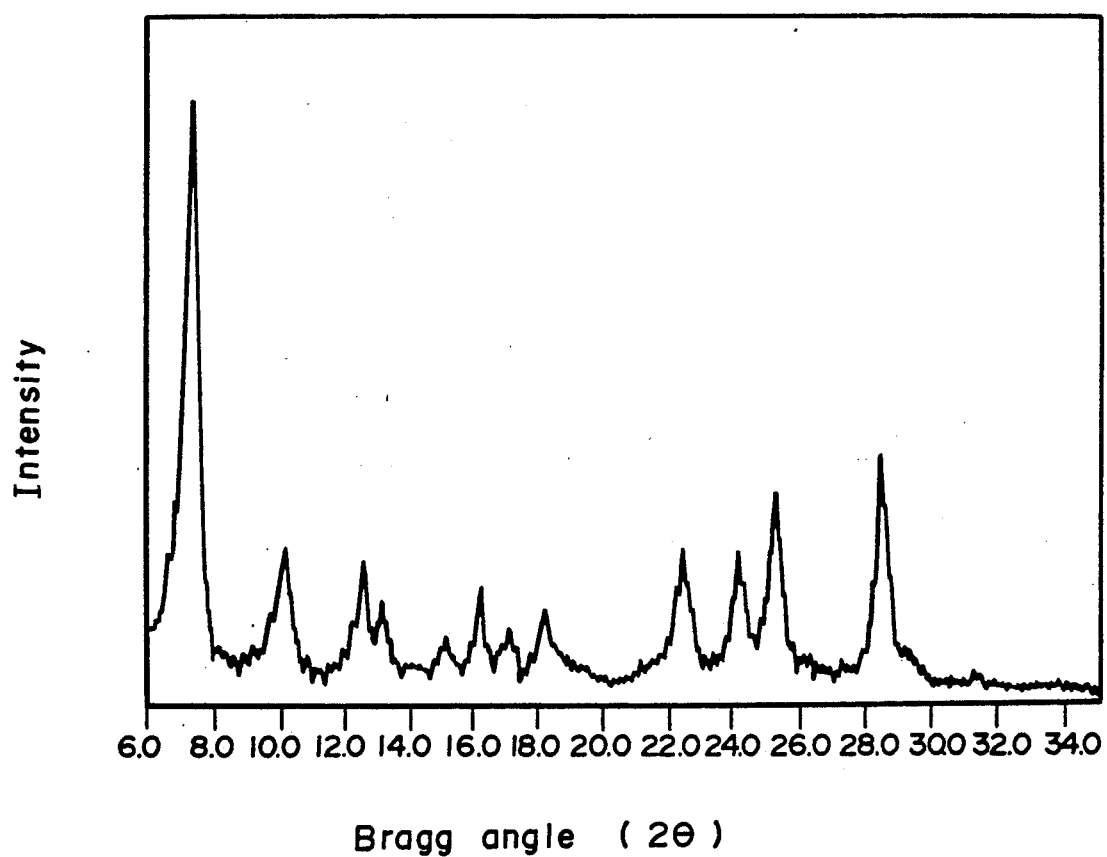
FIG. 10 is an X-ray diffractometer scan for the TiOPc used in Comparative Example 3.

The procedure of Synthesis Example 1 was repeated except that α-chloronaphthalene used as a dispersion medium for the milling operation was replaced by tetrahydrofuran and that milling was effected at 60°-80° C. An X-ray diffractometer scan for the obtained TiOPc is shown in FIG. 10, from which one can see that it was α-TiOPc having a maximum intensity peak at a Bragg angle (2θ) of 7.5°.

EXAMPLE 1

Three parts by weight of TiOPc that was prepared in Synthesis Example 1 and which had the X-ray diffraction pattern shown in FIG. 2, 20 parts by weight of a silicone resin ("KR-5240" in 15% xylene butanol solution produced by Shin-Etsu Chemical Co., Ltd:) and 100 parts by weight of methyl ethyl ketone were pulverized with a sand grinder to make a dispersion. The dispersion thus obtained was dip-coated onto an aluminum plate to form a carrier generation layer in a thickness of about 0.2 μm.

Figure 3:
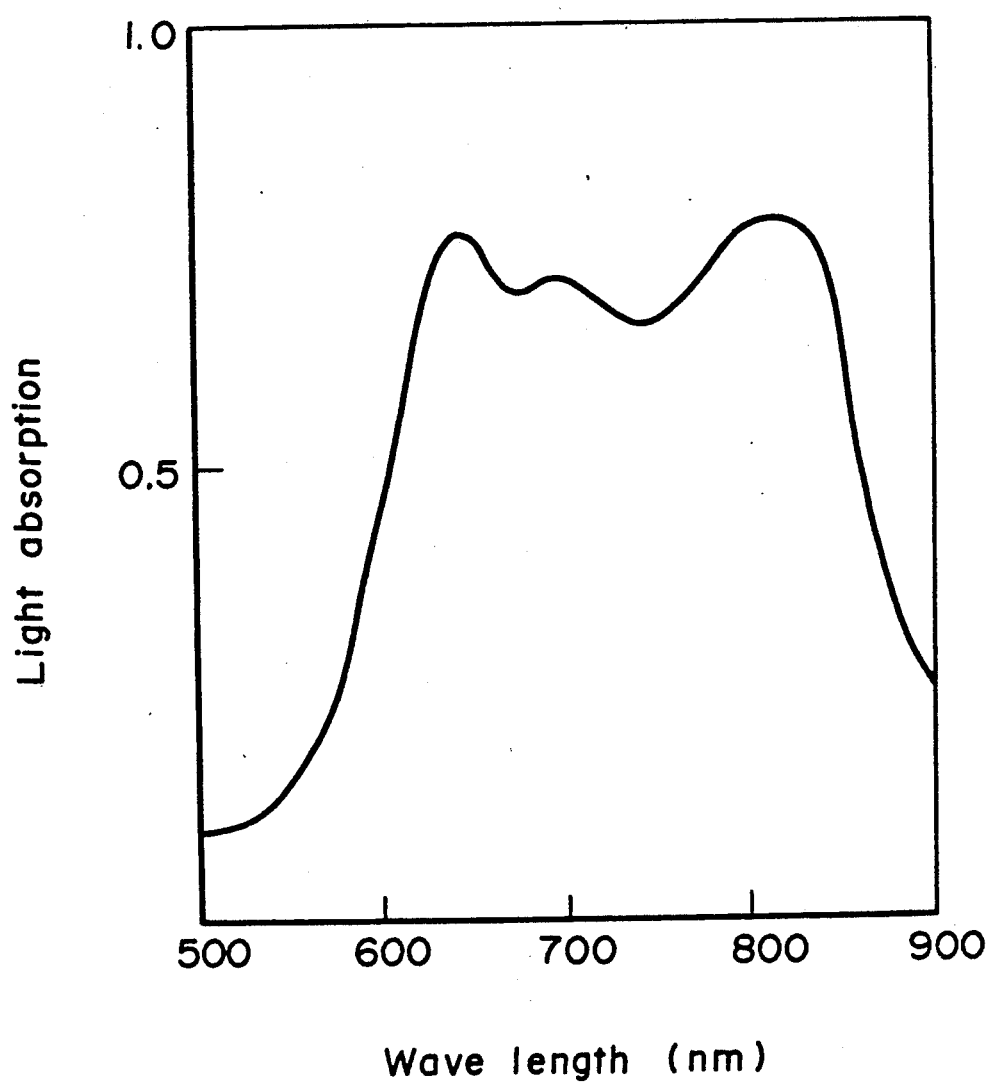
FIG. 3 is an absorption spectrum of the photoreceptor prepared in Example 1.

In a separate step, one part by weight of a carrier transport material (1), 2 parts by weight of a polycarbonate resin ("Iupilon Z 200" of Mitsubishi Gas Chemical Co., Inc.) and silicone oil ("KF-54" of Shin-Etsu Chemical Co., Ltd.) were dissolved in 25 parts by weight of 1,2-dichloroethane and the resulting solution was dip-coated onto the previously formed carrier generation layer and dried at 100° C. for 30 min to form a carrier transport layer in a thickness of 18 μm. The so prepared photoreceptor was designated as sample 1. An absorption spectrum of this photoreceptor is shown in FIG. 3.

EXAMPLE 2

Figure 5:
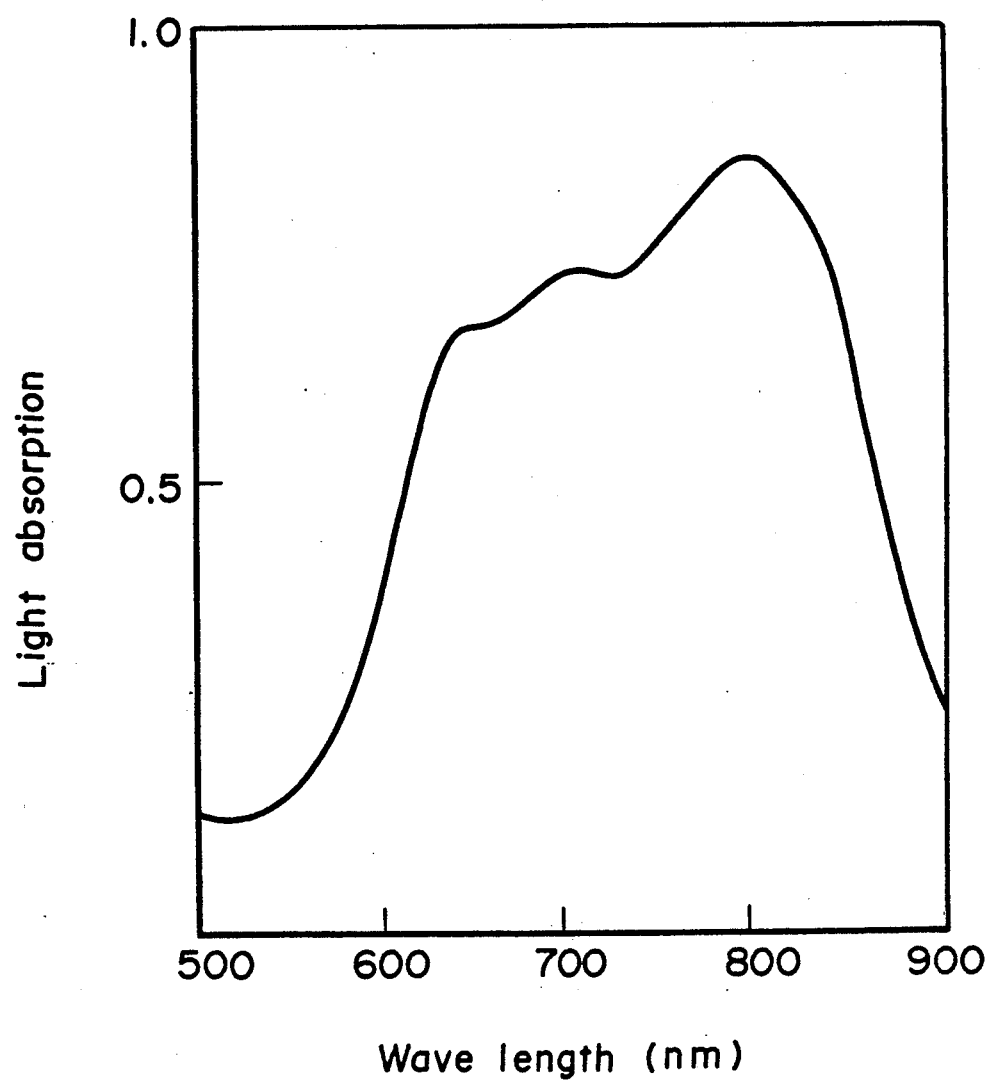
FIG. 5 is an absorption spectrum of the photoreceptor prepared in Example 2.

A photoreceptor was fabricated by repeating the procedure of Example 1 except that TiOPc prepared in Synthesis Example 1 was replaced by TiOPc prepared in Synthesis Example 2 and which had the X-ray diffraction pattern shown in FIG. 4. The so fabricated photoreceptor was designated as sample 2. An absorption spectrum of this photoreceptor is shown in FIG. 5.

COMPARATIVE EXAMPLE 1

Figure 7:
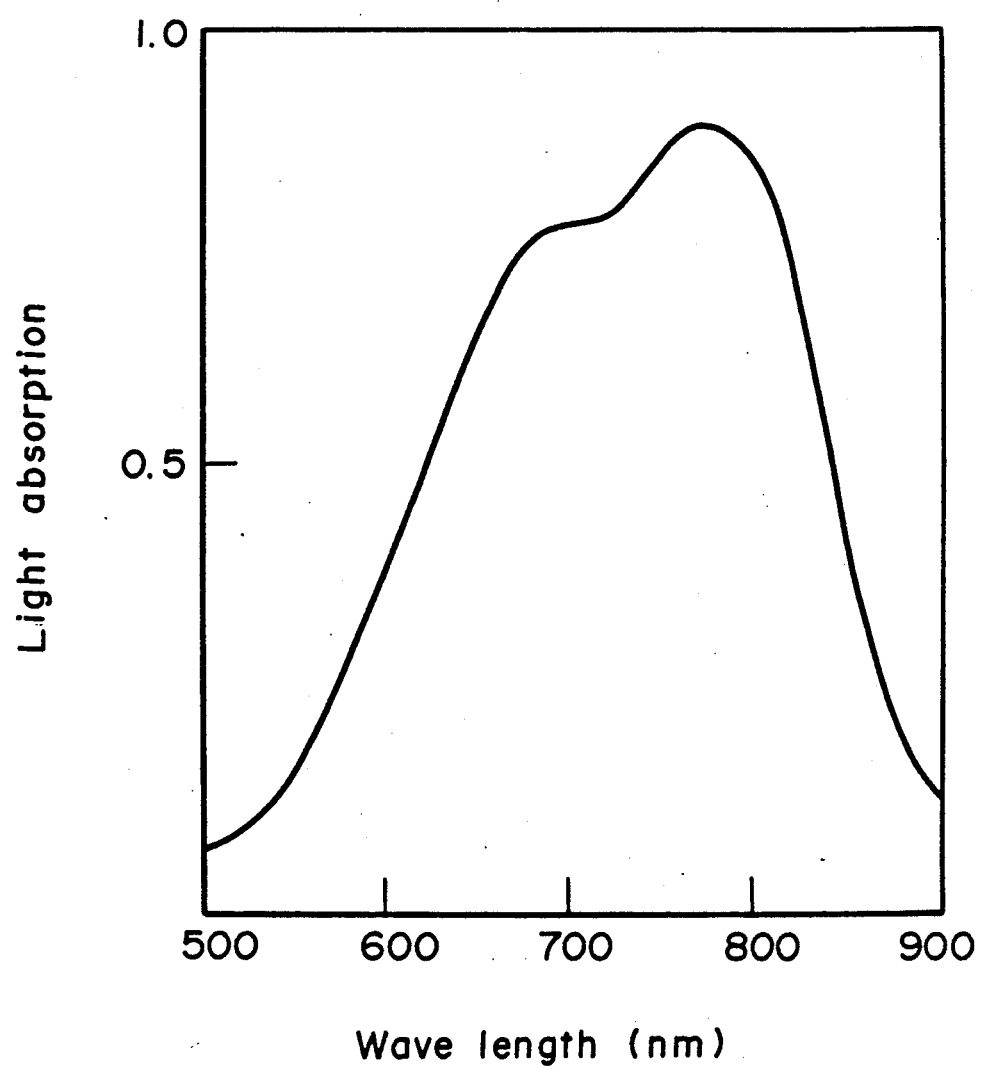
FIG. 7 is an absorption spectrum of the photoreceptor prepared in Comparative Example 1.

An additional photoreceptor was fabricated by repeating the procedure of Example 1 except that TiOPc prepared in Synthesis Example 1 was replaced by TiOPc prepared in Comparative Synthesis Example 1 and which had the X-ray diffraction pattern shown in FIG. 6. The so fabricated photoreceptor was designated as comparative sample 1. An absorption spectrum of this photoreceptor is shown in FIG. 7. It had a maximum absorption wavelength at 765 nm in the range of 500-900 nm, which was greatly different from the maximum absorption exhibited by the two photoreceptor samples of the present invention.

A photoreceptor having only a carrier generation layer formed on a polyester film had a transmission absorption spectrum which was essentially the same as what was obtained with comparative sample 1.

COMPARATIVE EXAMPLE 2

Figure 9:
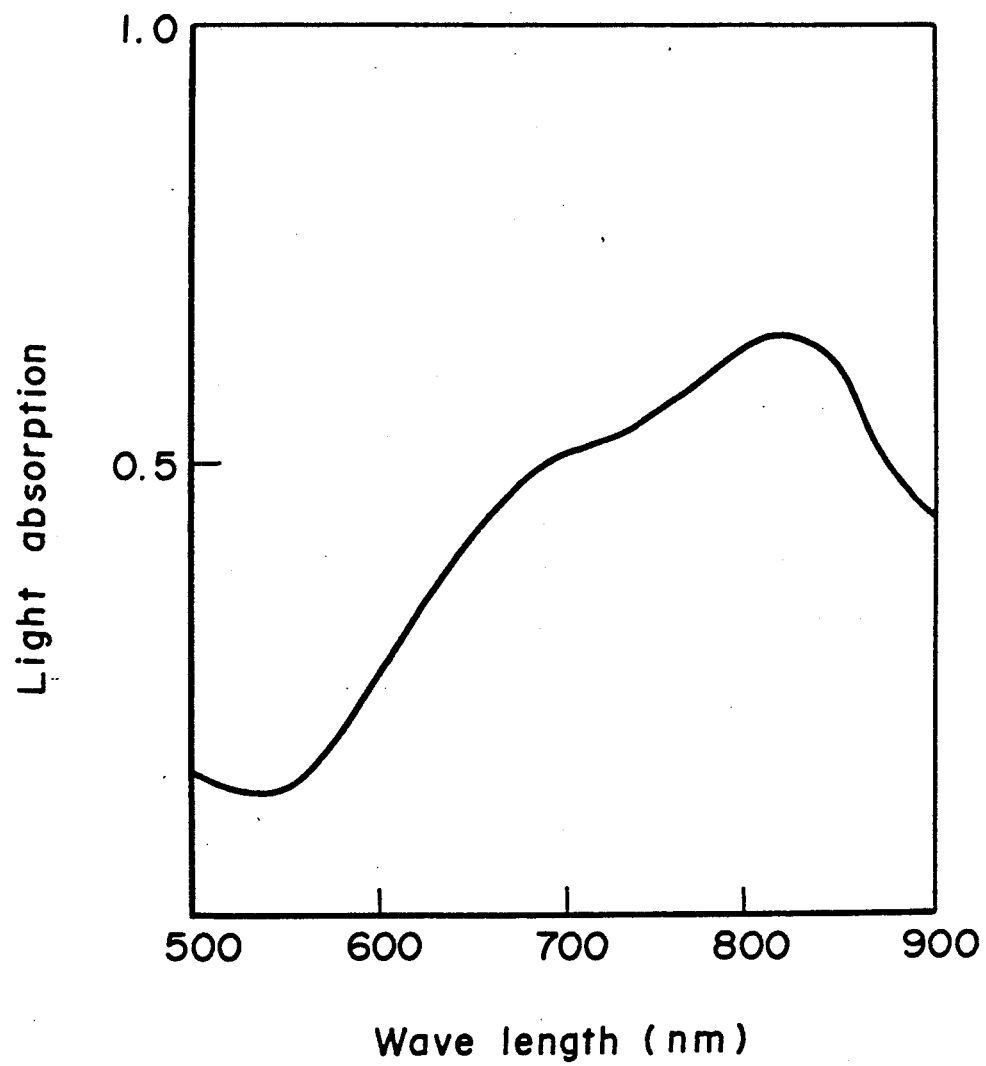
FIG. 9 is an absorption spectrum of the photoreceptor prepared in Comparative Example 2.

An additional photoreceptor was fabricated by repeating the procedure of Example 1 except that TiOPc prepared in Synthesis Example 1 was replaced by TiOPc prepared in Comparative Synthesis Example 1 and which had the X-ray diffraction pattern shown in FIG. 8. The so fabricated photoreceptor was designated as comparative sample 2. An absorption spectrum of this photoreceptor is shown in FIG. 9.

COMPARATIVE EXAMPLE 3

Figure 11:
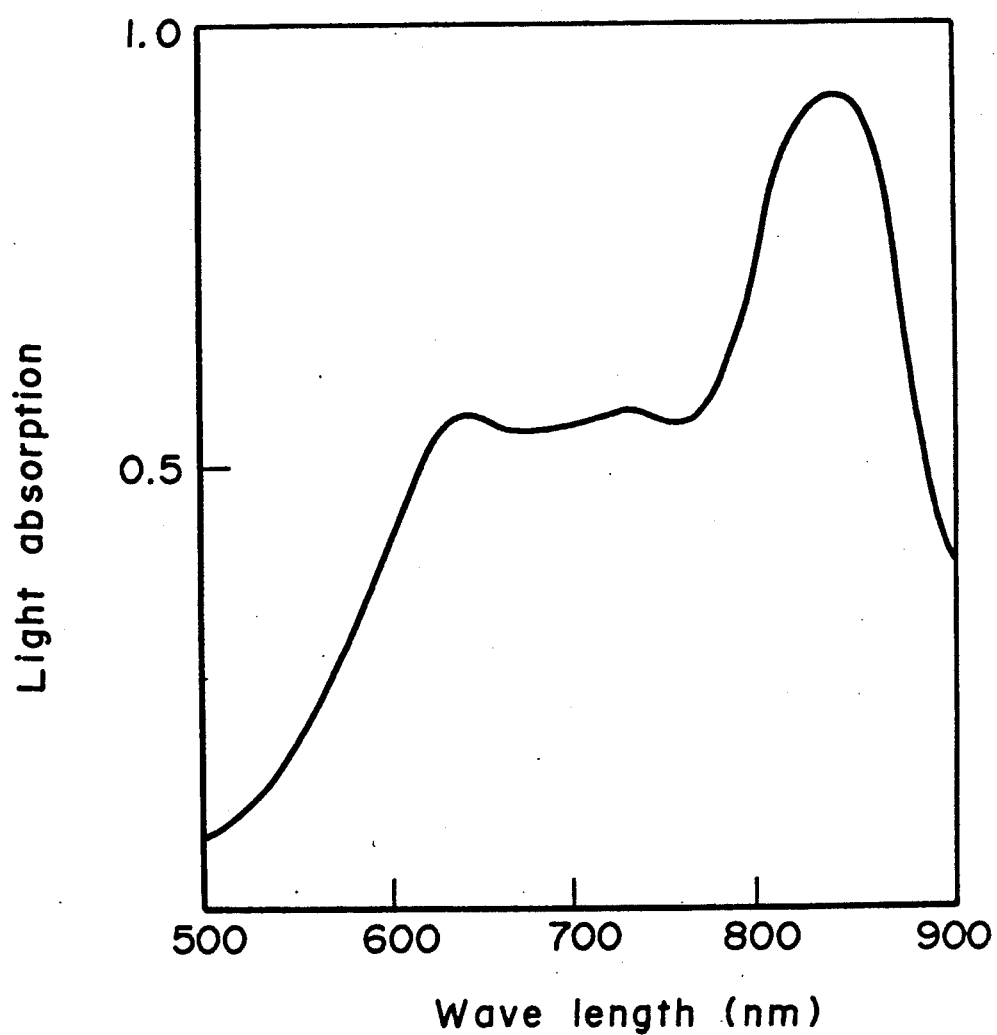
FIG. 11 is an absorption spectrum of the photoreceptor prepared in Comparative Example 3.

An additional photoreceptor was fabricated by repeating the procedure of Example 1 except that TiOPc prepared in Synthesis Example 1 was replaced by α-TiOPc prepared in Comparative Synthesis Example 2. The so fabricated photoreceptor was designated as comparative sample 3. An absorption spectrum of this photoreceptor is shown in FIG. 11.

COMPARATIVE EXAMPLE 4

Figure 12:
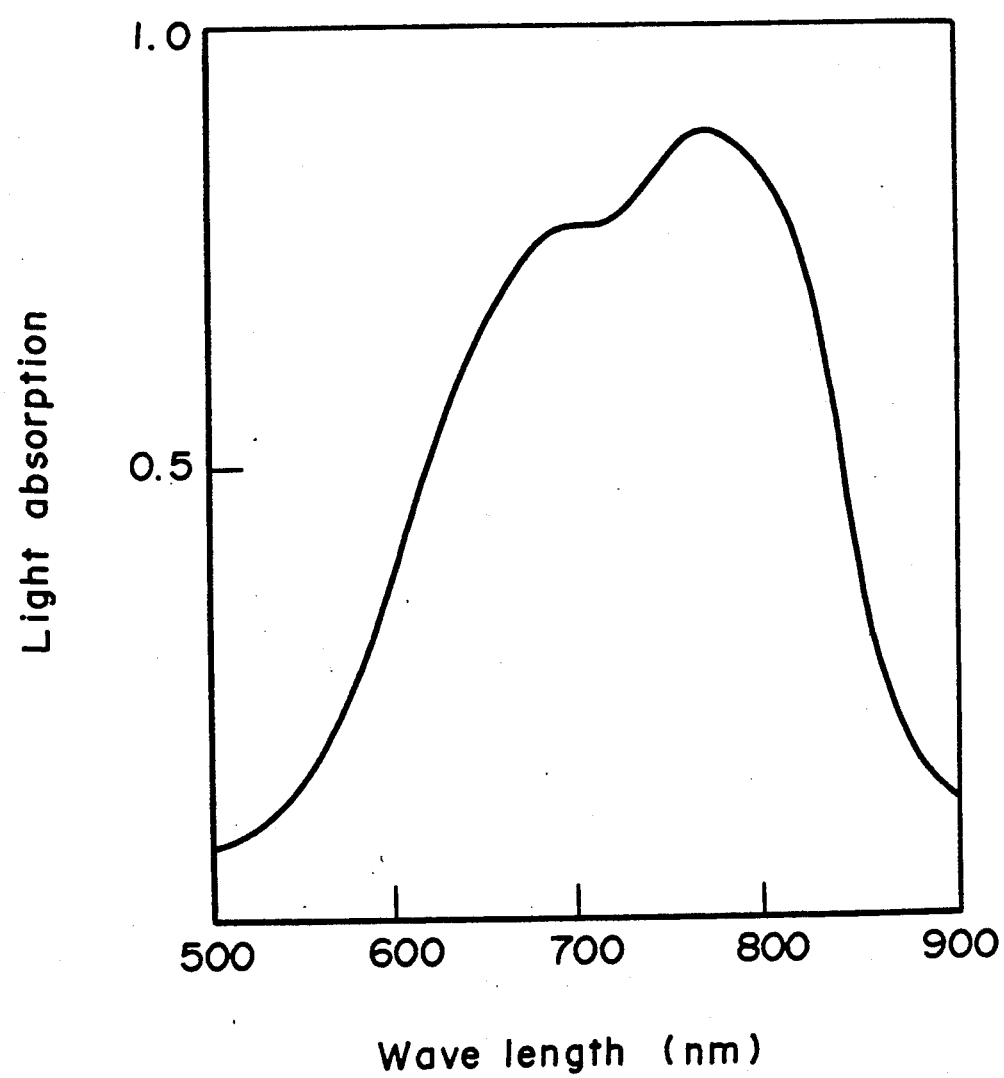
FIG. 12 is an absorption spectrum of the photoreceptor prepared in Comparative Example 4.
Figure 13:
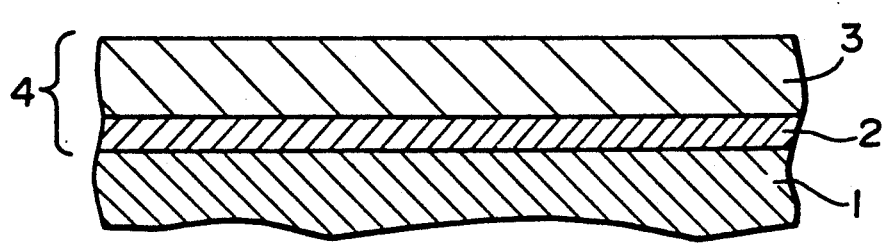
FIG. 13-18 are cross-sectional views showing specific examples of the layer arrangement for the photoreceptor of the present invention.

A photoreceptor was fabricated by superposing on the carrier generation layer of Comparative Example 1 a 18-μm thick carrier transport layer prepared from 90 parts by weight of N,N-diethylaminobenzaldehyde diphenyl hydrazone and 100 parts by weight of a polycarbonate resin ("Panlite K-1300" of TEIJIN LTD.). This photoreceptor was designated as comparative sample 4. An absorption spectrum of this photoreceptor is shown in FIG. 12, from which one can see that it had absorption maxima at 685 nm, 765 nm and 805 nm, with the most intense absorption occurring at the wavelength of 765 nm.

Evaluation

The samples were evaluated by the following procedures. First, they were charged with a paper analyzer (SP-428 of Kawaguchi Electric Works Co., Ltd.) for 5 sec at a charging current of 80 μA and the surface potential was measured both immediately after the charging (Va) and after being left in the dark for 5 sec (Vi). The samples were then exposed to light to a surface illuminance of 2 lux and the amount of exposure (E ½ in lux.sec) necessary to have the surface potential reduced to ½Vi was determined. Further, the percentage of dark decay (D) was calculated by the following equation:

$$D = \frac{Va - Vi}{Va} \times 100$$

The results are shown in Table 1.

TABLE 1

| | Va(V) | Vi(V) | E½ (lux · sec) | D(%) |
|---|---|---|---|---|
| Sample No. | | | | |
| 1 | −1230 | −950 | 0.38 | 22.8 |
| 2 | −1210 | −950 | 0.35 | 23.1 |
| Comparison | | | | |
| (1) | −830 | −480 | 2.10 | 42.2 |
| (2) | −1090 | −800 | 0.62 | 26.6 |
| (3) | −920 | −590 | 1.79 | 35.9 |
| (4) | −770 | −410 | 2.06 | 46.8 |

The data in Table 1 shows that the TiOPc prepared in accordance with the present invention had a particularly high sensitivity and showed good chargeability.

The α-TiOPc used in comparative sample 3 and the TiOPc of type II used in comparative sample 1 had low sensitivity and experienced extensive dark decay. The TiOPc of the present invention also had a higher sensitivity than the TiOPc used in comparative sample 2 which had the X-ray diffraction pattern shown in FIG. 8.

The six photoreceptor samples were subjected to 10,000 cycles of the ordinary Carlson process and $\Delta V_b$, or the difference between the as-charged surface potential measured at the initial stage and that measured after 10,000 cycles was determined. Also determined was the residual potential (Vr) after 10,000 cycles. The surface potential after exposure to a given amount of light (Vw) was also determined both at the initial stage and after 10,000 cycles. The results are shown in Table 2.

TABLE 2

| | $\Delta V_b$(V) | Vr(V) | Vw (initial) (V) | Vw (after 10⁴ cycles) (V) |
|---|---|---|---|---|
| Sample No. | | | | |
| 1 | −14 | 2 | 3 | 2 |
| 2 | −12 | 1 | 1 | 1 |
| Comparison | | | | |
| (1) | −82 | 38 | 85 | 72 |
| (2) | −28 | 4 | 8 | 7 |
| (3) | −61 | 19 | 53 | 46 |
| (4) | −93 | 42 | 82 | 71 |

The data in Table 2 shows that the photoreceptors of the present invention had good potential stability during cyclic use.

It is therefore clear that the electrophotographic photoreceptor of the present invention has high sensitivity and chargeability and exhibits good potential stability during cyclic use.

What is claimed is:

1. An electrophotographic photoreceptor containing titanyl phthalocyanine having a first maximum intensity peak of the Bragg angle 2θ at 27.3°±0.2° with respect to characteristic X-rays of Cu Kα at a wavelength of 1.541 A and which has a second maximum intensity peak of 6.8°±0.2° in the 2θ range of 6°–8°.

2. The photoreceptor of claim 1 wherein said titanyl phthalocyanine has peaks of the Bragg angle 2θ clearly distinct from noise at 6.8°±0.2°, 9.5°±0.2°, 11.5°±0.2°, 13.4°±0.2°, 18.0°±0.2°, 24.1°±0.2°, and 27.3°±0.2°; and which has a first maximum intensity peak at 27.3°±0.2° in the range 2θ range of 5°–35°.

3. The photoreceptor of claim 1 which is functionally separated, having a carrier generation material and a carrier transport material.

4. The photoreceptor of claim 1 which has a functionally separated light-sensitive layer comprising a carrier generation layer and a carrier transport layer, with said titanyl phthalocyanine in said carrier generation layer.

5. The photoreceptor of claim 3 wherein said carrier generation material is present in an amount of 10 to 600 parts by weight per 100 parts by weight of a binder, and said carrier transport material is present in an amount of 10 to 500 parts by weight per 100 parts by weight of said binder.

6. The photoreceptor of claim 3 wherein said carrier generation layer has a thickness of 0.01 to 20 μm, and said carrier transport layer has a thickness of 2 to 100 μm.

7. The photoreceptor of claim 3 wherein the carrier generation material has an average particle size not exceeding 2 μm.

8. The photoreceptor of claim 1 further containing an electron acceptor.

* * * * *